United States Patent
Panabaker et al.

(10) Patent No.: US 8,750,900 B2
(45) Date of Patent: Jun. 10, 2014

(54) FACILITATING USE OF A DEVICE BASED ON SHORT-RANGE WIRELESS TECHNOLOGY

(71) Applicant: Microsoft Corportation, Redmond, WA (US)

(72) Inventors: Ruston Panabaker, Bellevue, WA (US); Pasquale DeMaio, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/952,504

(22) Filed: Jul. 26, 2013

(65) Prior Publication Data

US 2013/0342426 A1 Dec. 26, 2013

Related U.S. Application Data

(63) Continuation of application No. 13/540,217, filed on Jul. 2, 2012, now Pat. No. 8,504,068, which is a continuation of application No. 12/767,005, filed on Apr. 26, 2010, now Pat. No. 8,238,938, which is a continuation of application No. 11/725,960, filed on Mar. 20, 2007, now Pat. No. 7,734,299.

(51) Int. Cl.
*G01S 5/02* (2010.01)
*G06F 3/14* (2006.01)

(52) U.S. Cl.
USPC ............ 455/456.1; 345/1.3; 345/1.1; 345/1.2

(58) Field of Classification Search
USPC ........................ 345/1.1–3.4; 455/550.1–575.9
See application file for complete search history.

(56) References Cited

U.S. PATENT DOCUMENTS 6,667,690 B2    12/2003  Durej et al.
6,867,965 B2 *   3/2005  Khoo .......................... 361/679.3

(Continued)

FOREIGN PATENT DOCUMENTS

WO    2006027725 A    3/2006
WO    2006085246 A    8/2006
WO    2006085269 A    8/2006

OTHER PUBLICATIONS

Calvet, Juan Carlos Lopez, "The role of RFID in the mobile phone", Date: 2005, http://www.telenor.com/telektronikk/volumes/pdf/3_4.2005/Page_131-142.pdf.

(Continued)

*Primary Examiner* — Kashif Siddiqui
(74) *Attorney, Agent, or Firm* — John Jardine; Andrew Sanders; Micky Minhas

(57) ABSTRACT

Various devices may include a short-range wireless transmitter and/or one or more short-range wireless readers. When a first device including the transmitter is placed near a second device including the one or more readers, a relative location of the first device may be determined. Information regarding the relative location of the first device, may be used to facilitate use of the first device with a processing device. In one embodiment, the processing device may automatically configure itself, such that the first device may be used with the processing device. In another embodiment, the processing device may provide feedback, such as, for example, step-by-step instructions to facilitate setup and use of the first device with the processing device. In some embodiments, an application program interface may provide information about the device to an application executing on the processing device.

20 Claims, 6 Drawing Sheets

(56) References Cited

U.S. PATENT DOCUMENTS

| | | | | |
|---|---|---|---|---|
| 7,310,070 B1* | 12/2007 | Hardman et al. | | 343/742 |
| 7,646,316 B2* | 1/2010 | Khoo | | 341/22 |
| 7,948,450 B2* | 5/2011 | Kay et al. | | 345/1.3 |
| 2003/0122673 A1* | 7/2003 | Anderson | | 340/568.7 |
| 2005/0054350 A1* | 3/2005 | Zegelin | | 455/456.1 |
| 2005/0073418 A1* | 4/2005 | Kelliher et al. | | 340/572.1 |
| 2005/0093868 A1* | 5/2005 | Hinckley | | 345/502 |
| 2005/0208983 A1* | 9/2005 | Khoo | | 455/575.1 |
| 2005/0283443 A1* | 12/2005 | Hardt | | 705/67 |
| 2006/0018996 A1* | 1/2006 | Pollock et al. | | 426/19 |
| 2006/0092072 A1* | 5/2006 | Steiner | | 342/46 |
| 2006/0094356 A1 | 5/2006 | Dawidowsky | | |
| 2006/0128384 A1 | 6/2006 | Jagadeesan et al. | | |
| 2006/0160487 A1 | 7/2006 | Nam et al. | | |
| 2006/0164237 A1 | 7/2006 | Medve et al. | | |
| 2006/0223536 A1 | 10/2006 | Chia | | |
| 2006/0292984 A1* | 12/2006 | Teate et al. | | 455/41.2 |
| 2007/0042807 A1* | 2/2007 | Khoo | | 455/557 |
| 2008/0065238 A1* | 3/2008 | Igoe | | 700/15 |
| 2009/0174670 A1* | 7/2009 | Diederiks | | 345/173 |
| 2009/0237379 A1* | 9/2009 | Lawrenz | | 345/204 |
| 2010/0180055 A1* | 7/2010 | Lyon et al. | | 710/62 |
| 2011/0140993 A1* | 6/2011 | Bess | | 345/2.3 |
| 2012/0062475 A1* | 3/2012 | Locker et al. | | 345/173 |

OTHER PUBLICATIONS

Pering, et al., "Spontaneous Marriages of Mobile Devices and Interactive Spaces", Date: Sep. 2005, pp. 53-59, vol. 48, Issue 9, http://delively.acm.org/10.1145/1090000/1082020/p53-pering. pdf?key1=1082020&key2=6468494611&coll=GUIDE&dl=GUIDE&CFID=7682489&CFTOKEN=58955499.

Scott, et al., "Using Visual Tags to Bypass Bluetooth Device Discovery", Date: Jan. 2005, pp. 41-53, vol. 9, Issue 1, http://delivery.acm.org/10.1145/1060000/1055965/p41-scott.pdf? key1=1055965&key2=3638984611&coll=GUIDE&dl=GUIDE&CFID=5798034&CFTOKEN=71810490.

\* cited by examiner

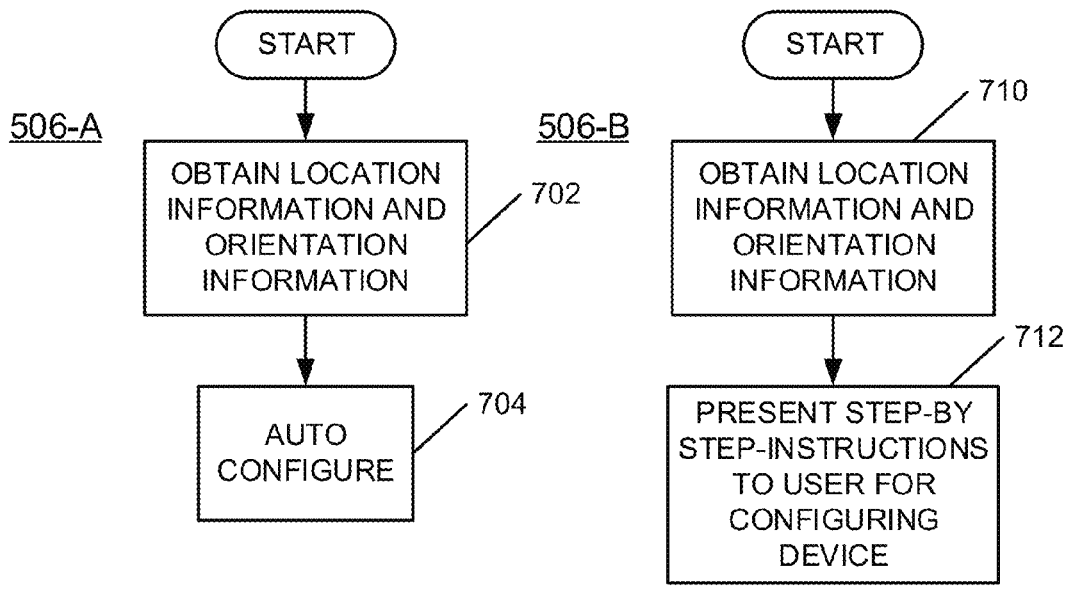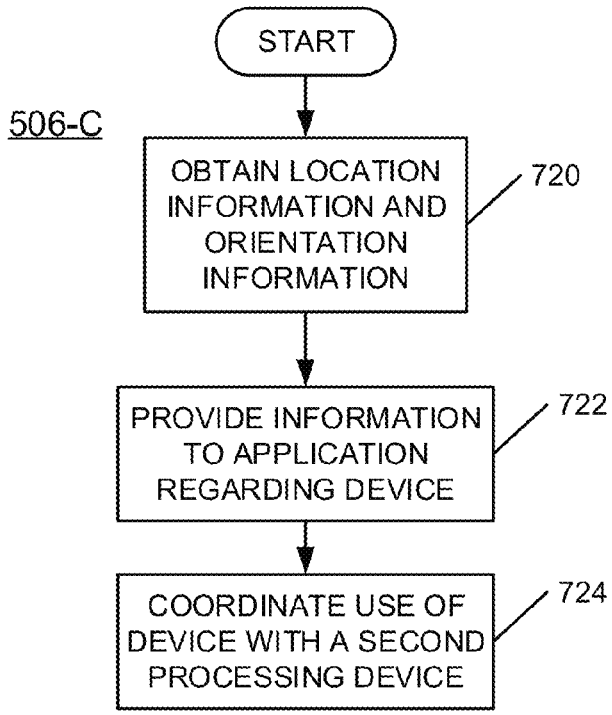

FACILITATING USE OF A DEVICE BASED ON SHORT-RANGE WIRELESS TECHNOLOGY

This application is a continuation application of U.S. patent application Ser. No. 13/540,217, filed in the U.S. Patent and Trademark Office on Jul. 2, 2012, now U.S. Pat. No. 8,504,068, issued Aug. 6, 2013, entitled "FACILITATING USE OF A DEVICE BASED ON SHORT-RANGE WIRELESS TECHNOLOGY," ("the '068 Patent"). The '068 Patent is a continuation application of U.S. patent application Ser. No. 12/767,005, filed in the U.S. Patent and Trademark Office on Apr. 26, 2010, now U.S. Pat. No. 8,238,938, issued Aug. 7, 2012, entitled "FACILITATING USE OF A DEVICE BASED ON SHORT-RANGE WIRELESS TECHNOLOGY," ("the '938 Patent"). The '938 Patent is a continuation application of U.S. patent application Ser. No. 11/725,960, filed in the U.S. Patent and Trademark Office on Mar. 20, 2007, issued as U.S. Pat. No. 7,734,299 on Jun. 8, 2010, entitled "FACILITATING USE OF A DEVICE BASED ON SHORT-RANGE WIRELESS TECHNOLOGY," ("the '299 Patent"). Each of the afore-referenced application(s) and patent(s) is incorporated by reference.

BACKGROUND

A user of a processing device, such as a personal computer, may arrange multiple display monitors on a desk for use with the processing device. Such an arrangement requires the user to have a significant level of skill to configure the multiple display monitors to properly work with the processing device, given a relative location of the multiple display monitors with respect to one another, an orientation of the multiple display monitors, and types and capabilities of the multiple display monitors. For example, the user may need to take initiative to discover display monitor sharing technologies and to learn how to configure multiple display monitors to share display screens. Further, when configuring a second display monitor to work with a processing device and a first display monitor, the processing device may assume that the second display monitor has a specific relative location to the first display monitor. For example, the processing device may assume that the second display monitor is physically located on a right side of the first display monitor, thereby requiring the user to indicate to the processing device a correct relative physical location of the second display monitor with respect to the first display monitor when the second display monitor does not have the relative location assumed by the processing device.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a first device, to be used with a processing device, may include a short-range wireless transmitter. A second device, to be used with the processing device, may include one or more short-range wireless readers for reading a signal transmitted by the short-range wireless transmitter. In some embodiments, the short-range wireless transmitter may be a portable contactless smartcard transceiver attached to, or embedded within, the first device. When the first device is placed near the second device, the short-range wireless transmitter of the first device may transmit a signal, which may be received by the one or more short-range wireless readers of the second device. The signal may include an identification of the first device, which may indicate a type of the first device, and may include other information. Information from the signal, along with related information, such as, for example, signal strength information from the one or more short-range wireless readers, may be sent to a processor of the processing device, which may use the signal strength information to determine a relative location of the first device. Information about the relative location of the first device may be used by the processing device to facilitate use of the first device with the processing device. In one embodiment, the first device and the second device may be display monitors and the information about the relative location of the first device may include information about the relative location of one of the display monitors with respect to another of the display monitors.

In other embodiments, the devices may be other types of devices. For example, in an embodiment consistent with the subject matter of this disclosure, the first device may be a digital camera including a short-range wireless transmitter, and the second device may be a component of a processing device, such as, for example, a keyboard having one or more short-range wireless readers for reading a signal transmitted by the short-range wireless transmitter. When the digital camera is placed close to the keyboard, the one or more short-range wireless readers may read a signal transmitted by the short-range wireless transmitter. An identification of the digital camera, which may be included in the short-range signal, may be provided to a processor of the processing device, along with signal strength information from the one or more short-range wireless readers. Based, at least in part, on the signal strength information, the processor may determine a relative location of the digital camera and may provide feedback to a user to facilitate use of the digital camera with the processing device. In one embodiment, the feedback may include step-by-step instructions for a user to configure the processing device for use with the digital camera.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 a functional block diagram illustrating an exemplary processing device, which may be used in implementations consistent with the subject matter of this disclosure.

FIGS. 5-7C are flowcharts illustrating exemplary processes, which may be performed in embodiments consistent with the subject matter of this disclosure.

DETAILED DESCRIPTION

Figure 1:
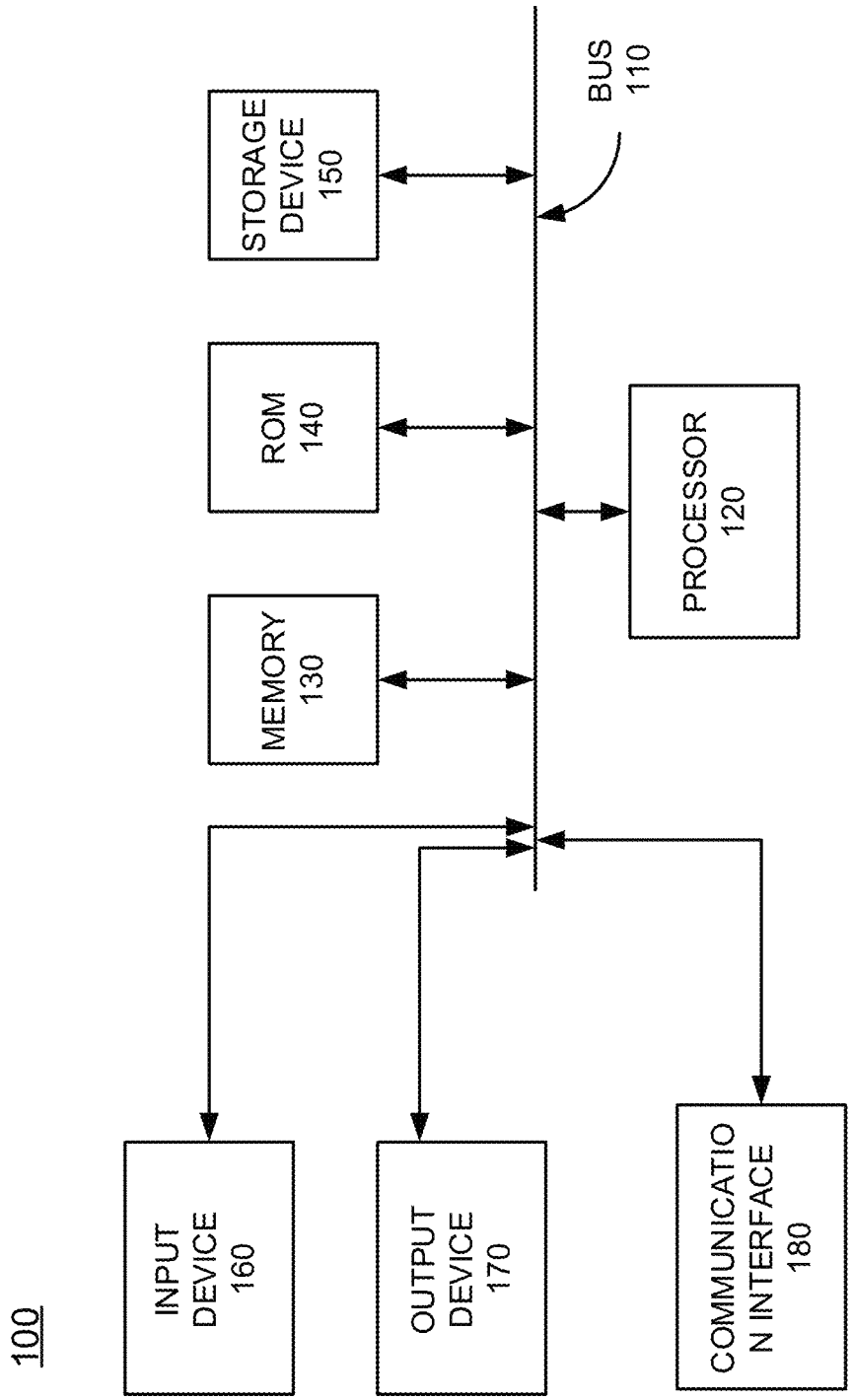

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

Near Field Communication (NFC) is a short-range wireless technology developed from existing contactless identification technologies and interconnection technologies. Radio Frequency Identification (RFID) technology, typically, is used as an alternative to bar coding. RFID technology uses devices attached to objects to transmit data to an RFID receiver. Both technologies involve short-range wireless communication.

In embodiments consistent with the subject matter of this disclosure, a first device may include a transmitter for transmitting a short-range wireless protocol signal. The transmitter may be a portable contactless smart card transceiver attached to, or embedded within, the first device. The transmitter may transmit information identifying the first device via a short-range wireless protocol signal, such as, for example, a Near Field Communication (NFC) protocol signal or a Radio Frequency IDentification (RFID) protocol signal. One or more readers may be attached to, or embedded within, a second device, which may be associated with a processing device. The one or more readers may receive and read information included in a transmitted short-range wireless protocol signal. In one embodiment, the first device and the second device may be display monitors, located close to one another, to be used with the processing device. In another embodiment, the first device and the second device may be display monitors, located close to one another, and connected to different processing devices, wherein the processing devices may cooperate such that the display monitors work cooperatively. In a third embodiment, the first device may be a display monitor and the second device may be a keyboard connected to the processing device.

In one embodiment a first display monitor may be connected to a processing device. The first display monitor may have attached thereto, or embedded therein, one or more readers for receiving and reading information from a short-range wireless signal, such as, for example, a NFC protocol signal, a RFID protocol signal, or other short-range wireless signal. A second display monitor, to be used with the first display monitor, may be moved into a position close to the first display monitor. The second display monitor may have attached thereto, or embedded therein, a transmitter for transmitting a short-range wireless signal, such as, for example, a NFC protocol signal, a RFID protocol signal, or other signal. The transmitted short-range wireless signal may include an identification identifying the second display monitor. The one or more readers of the first display monitor may read the transmitted short-range wireless signal and may transmit information regarding the short-range wireless signal to a processor of the processing device. The processor may determine a relative location of the second display monitor using a triangulation technique, and may determine an orientation of the second display monitor based, at least partly, on a strength of the signal received by the one or more readers. The processor may then use information related to the relative location of the second display monitor with respect to the first display monitor to facilitate use of the second display monitor with the first display monitor. For example, the processing device may automatically configure itself to work with the second display monitor, in addition to the previously-configured first display monitor.

In an alternate embodiment, instead of automatically configuring the processing device to work with the second display monitor, the processing device may provide step-by step instructions to a user for configuring the processing device to use the second display monitor. For example, the processing device may display information indicating a relative location of the second display monitor with respect to the first display monitor and may ask the user to confirm the relative location of the second display monitor. By using the information identifying the second display monitor, the processing device may determine a type of the second display monitor and may provide detailed information to a user for connecting the second display monitor to the processing device and configuring the processing device to work with the second display monitor.

In other embodiments, another type of device may include a short-range wireless transmitter, which may be a contactless transmitter, such as a NFC transmitter, a RFID transmitter, or another type of contactless short-range wireless transmitter. For example, the device may be a digital camera or other device that may be used with a processing device. Short-range wireless readers attached to or embedded within one or more components of the processing device may read a signal from the short-range wireless transmitter. A relative location of the device may be determined by using a triangulation technique and the relative location of the device may be used to present a user with feedback for facilitating use of the device. In one embodiment, the feedback may include step-by-step-instructions for configuring the processing device to work with the device. For example, the processing device may present a display showing the relative location of the device with respect to the processing device or a component thereof, such as, for example, a keyboard, a monitor, or other component.

Exemplary Processing Device

FIG. 1 is a functional block diagram that illustrates an exemplary processing device 100, which may be used to implement embodiments consistent with the subject matter of this disclosure. Processing device 100 may include a bus 110, a processor 120, a memory 130, a read only memory (ROM) 140, a storage device 150, an input device 160, an output device 170, and a communication interface 180. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media for storing data and/or instructions.

Input device 160 may include one or more conventional mechanisms that permit a user to input information to processing device 100, such as, for example, a keyboard, a mouse, or other input device. Output device 170 may include one or more conventional mechanisms that output information to the user, including one or more displays, or other output devices.

Processing device 100 may perform such functions in response to processor 120 executing sequences of instructions contained in a tangible machine-readable medium, such as, for example, memory 130, or other medium. Such instructions may be read into memory 130 from another machine-readable medium, such as storage device 150, or from a separate device via communication interface 180, which may include a transceiver for providing a wired or wireless communication interface to a network.

Exemplary Configurations

Figure 2:
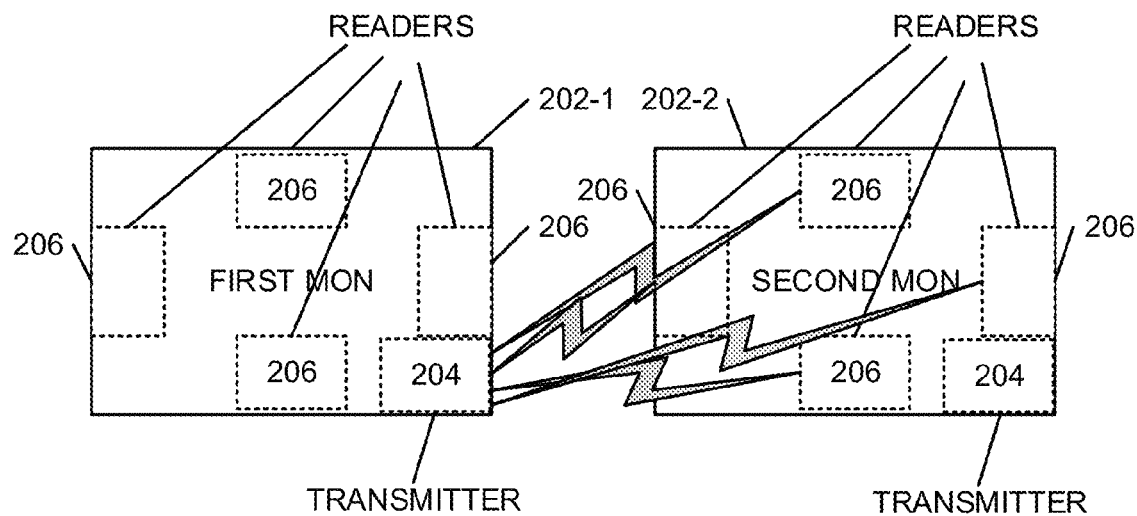
FIG. 2 is a functional block diagram illustrating display monitors, which may be used in embodiments consistent with the subject matter of this disclosure.

FIG. 2 illustrates an exemplary configuration including two display monitors, a first monitor 202-1 and a second monitor 202-2, which may be used in embodiments consistent with the subject matter of this disclosure. First and second monitors 202-1, 202-2 each may include a short-range wireless transmitter 204 (also known as a target) for transmitting a short-range wireless signal, which may include an identifier to identify each respective monitor and other useful information for configuring a processing device to work with the respective monitors. Transmitter 204 may be attached to the respective monitors, or may be embedded therein. In the exemplary configuration of FIG. 2, transmitter 204 is shown attached to, or embedded within a bottom right portion of display monitors 202-1, 202-2, although transmitter 204 may be attached or embedded in a number of different locations of monitors 202-1, 202-2. The short-range wireless signal may be sent using a Near Field Communication (NFC) protocol, a Radio Frequency IDentification (RFID) protocol, or another short-range wireless protocol. In some embodiments, transmitter 204 may be a contactless transceiver.

First monitor 202-1 and second monitor 202-2 each may include one or more short-range wireless signal readers 206 (also known as initiators). In the exemplary configuration of FIG. 2, each of monitors 202-1, 202-2 may include four readers 206. Readers 206 may be located at a top portion, a bottom portion, a right-side portion, and a left-side portion of monitors 202-1, 202-2. Of course, in other embodiments, monitors may have more or fewer readers 206 located in different or additional locations. The exemplary configuration illustrated in FIG. 2 shows transmitter 204 of first monitor 202-1 transmitting a short-range wireless signal which may be received by readers 206 of second monitor 202-2. Of course, transmitter 204 of second monitor 202-2 may transmit a short-range wireless signal which may be received by readers 206 of first monitor 202-1.

The configuration shown in FIG. 2 is exemplary. In other embodiments, other configurations may be employed. For example, first monitor 202-1 may include one or more readers 206 and no transmitter 204, while second monitor 202-2 may include one transmitter 204 and no readers 206. In another exemplary configuration, either of first monitor 202-1 or second monitor 202-2 may be an ultra-wideband wireless monitor. Of course, numerous other configurations may be employed in other embodiments consistent with the subject matter of this disclosure.

Figure 3:
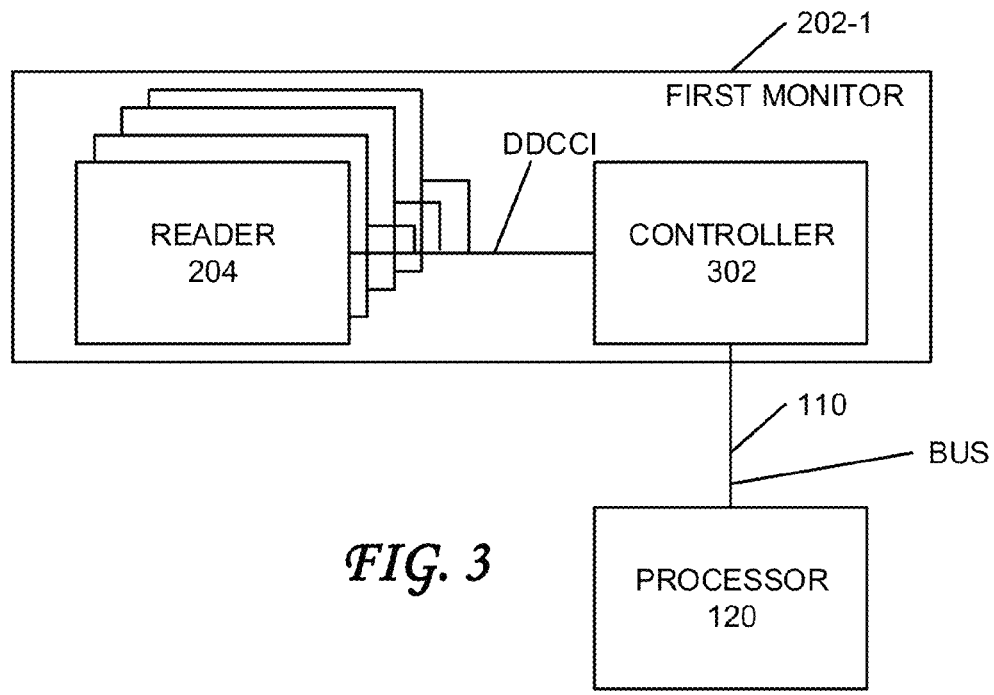
FIG. 3 is a functional block diagram illustrating one way in which short-range wireless readers, included in an exemplary display monitor, may provide information to a processor of a processing device.

FIG. 3 shows an exemplary configuration of readers 204 in the first monitor 202-1. When readers 204 read a short-range wireless signal, information from the signal may be sent to a controller 302 of first monitor 202-1 via a Display Data Channel/Command Interface (DDCCI). Controller 302 may pass the information from the signal to processor 120 via bus 110. In other embodiments, other configurations may be implemented. For example, in one embodiment, readers 204 may pass the information from the signal directly from readers 204, via bus 110, to processor 120.

Figure 4:
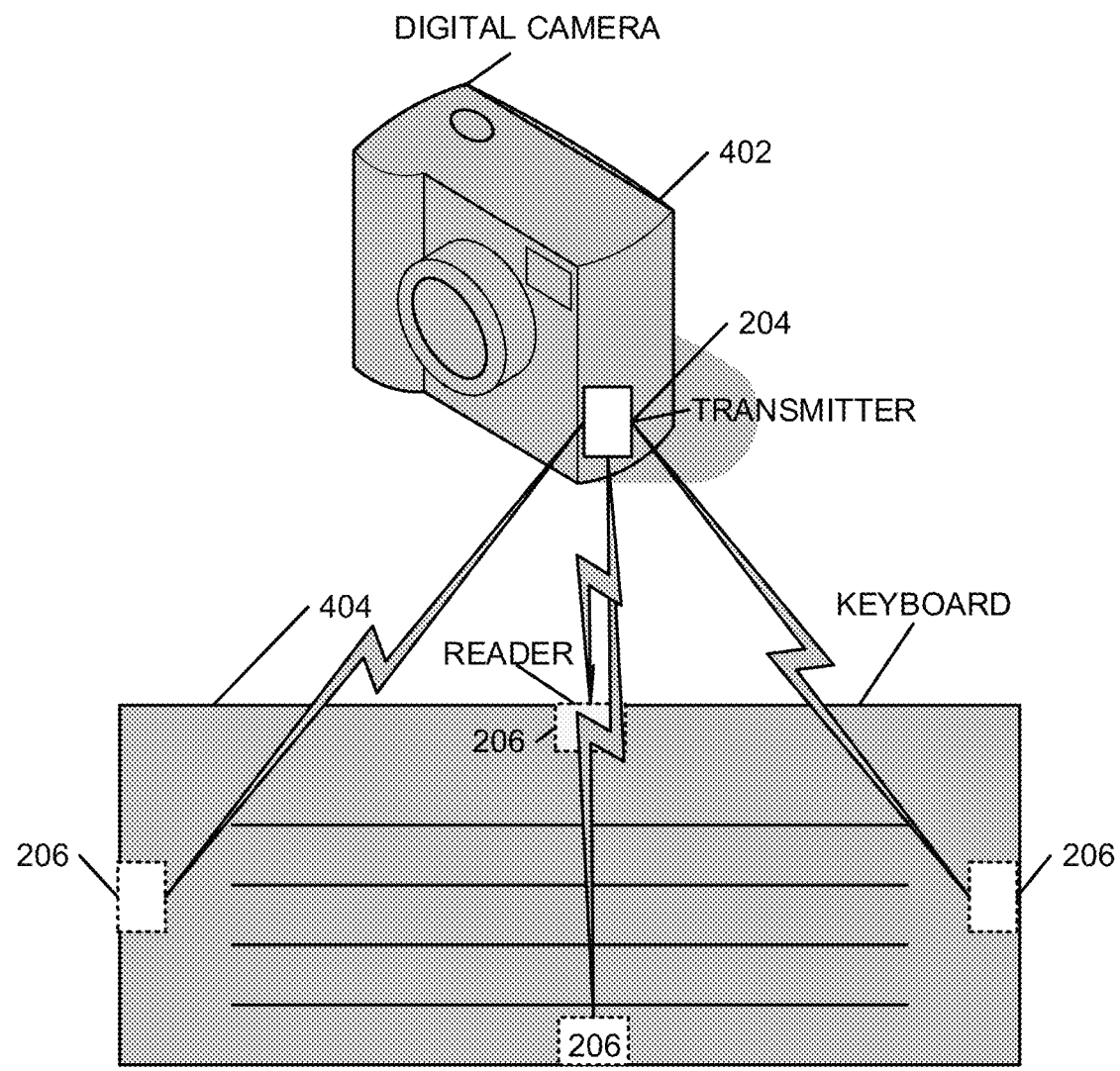
FIG. 4 illustrates a digital camera and a keyboard, which may be used in embodiments consistent with the subject matter of this disclosure.

FIG. 4 illustrates other devices, which may be used in embodiments consistent with the subject matter of this disclosure. For example, a digital camera 402 may include transmitter 204 for transmitting a short-range wireless signal. Transmitter 204 may be a contactless transmitter attached to digital camera 402 or embedded within digital camera 402. A keyboard 404 may include a number of readers 206 for reading a transmitted short-range wireless signal. In the exemplary embodiment of FIG. 4, keyboard 404 includes four readers 206 located at a top portion of keyboard 404, a right-side portion of keyboard 404, a left-side portion of keyboard 404, and a bottom portion of keyboard 404. Readers 204 may be attached to keyboard 404, or may be embedded within keyboard 404. In other embodiments, keyboard 404 may include more or fewer readers 206, which may be placed at other locations of keyboard 404. FIG. 4 illustrates transmitter 204 of digital camera 402 transmitting a short-range wireless signal which may be received by readers 206 of keyboard 404.

In one embodiment, when a digital camera 402 is located close to keyboard 404, readers 206 may read a signal from transmitter 204. The signal may include an identifier of digital camera 402. Readers 206 may transmit information from the received signal, such as, for example, the identifier of digital camera 402, to processor 120 directly, through a communication interface used by keyboard 404, or via a keyboard controller (not shown). Processor 120 may receive information from the received signal and may look up the identifier in a table, thereby identifying the signal as one being sent from digital camera 402. Processor 120 may have access to information regarding locations of readers 206 within keyboard 404. Processor 120 may further receive information concerning a strength of the received signal from readers 206 and may use a triangulation technique to determine a relative location of digital camera 402 with respect to keyboard 404. In some embodiments, processor 120 may cause a display to be presented to a user showing a relative location of digital camera 402 with respect to some component of the processing device, such as, for example, keyboard 404, or another component of the processing device, which may include one or more readers 206. Further, processor 120 may display instructions to the user, such as, for example, step-by-step instructions for the user to configure digital camera 402 to work with the processing device.

Exemplary Processing

Figure 5:
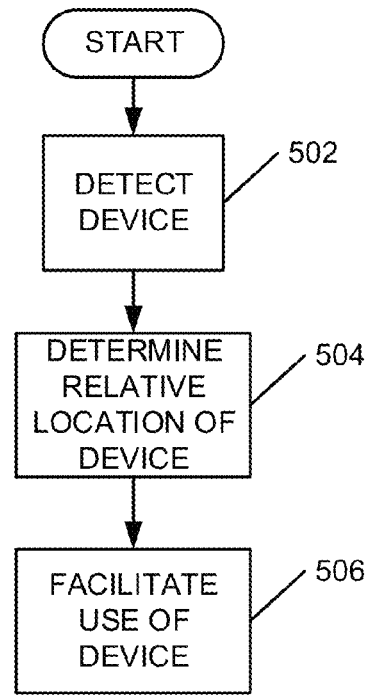

FIG. 5 illustrates a flowchart of an exemplary process that may be implemented in embodiments consistent with the subject matter of this disclosure. First, a device associated with a processing device, such as, for example, a display monitor, a keyboard, or other device, having a number of short-range wireless signal readers attached to or embedded therein, may detect and receive a signal transmitted from a short-range wireless signal transmitter attached to, or embedded within a second device, which may not yet be associated with the processing device, such as, for example, a digital camera, a display monitor, or other device (act 502). The signal may include an identifier identifying the second device as a monitor, a digital camera, or other device, and may include information concerning a location of the short-range wireless signal transmitter with respect to the second device. Information about the signal, the identifier, and the location of the short-range wireless signal transmitter with respect to the second device, may be passed through a communication interface to a processor, such as processor 120, which may process the information, including signal strength information from the short-range wireless signal readers, and may determine a relative location of the second device with respect to the first device using a triangulation technique or other technique and may determine an orientation of the second device (act 504).

Figure 6:
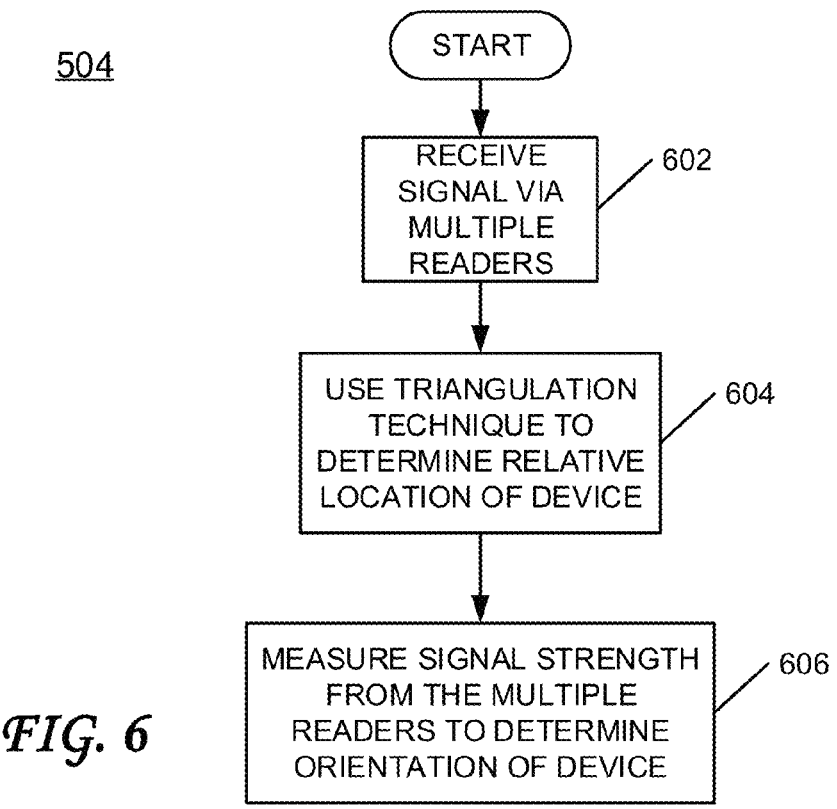

FIG. 6 is a flowchart illustrating an exemplary process of act 504 for determining the relative location of the second device. First, a processor, such as processor 120, may receive information about a received signal from multiple short-range wireless signal readers 206 (act 602). The information may include signal strength information from each one of multiple readers 206, an identification of the second device, and information regarding the location of the short-range wireless signal transmitter with respect to the second device. Next, processor 120 may execute instructions to perform a triangulation technique using the signal strength information from each one of multiple readers 206 to determine a location of the second device with respect to the device associated with the processing device (act 604). Further, processor 120 may execute instructions to determine an orientation of the second device based, at least partly, on the measured signal strength from multiple readers 206 (act 606). For example, if the second device is a display monitor, processor 120 may determine whether the display monitor is positioned in a portrait orientation or a landscape orientation.

Returning back to FIG. 5, the processor may then facilitate use of the second device with the processing device (act 506).

FIG. 7A is a flowchart of an exemplary process 506-A for performing act 506 of FIG. 5 for facilitating use of the second device. First, processor 120 of the processing device may obtain relative location information and orientation information with respect to the second device (act 702). Next, processor 120 of the processing device may execute instructions to automatically configure the processing device to work with the second device (act 704). In some embodiments, configuring the processing device to work with the second device may include the processing device querying the second device to determine whether the second device has one or more readers 206. If the second device has one or more readers 206, then the second device may respond to the processing device with information concerning a number of readers 206 included in the second device, as well as information concerning locations of the number of readers 206 with respect to the second device. Thus, the processing device may store information concerning readers 206 included in the second device, as well as their locations with respect to the second device. The information may be used at a later time to determine the relative location and/or an orientation of a third device, including transmitter 204, when the third device is placed near the second device.

FIG. 7B is a flowchart of an exemplary process 506-B for performing act 506 of FIG. 5 in another embodiment consistent with the subject matter of this disclosure. First, the processor of the processing device may obtain relative location information and orientation information with respect to the second device (act 710). Next, the processing device may execute instructions to provide feedback to facilitate setup and use of the second device with the processing device. In one embodiment, the feedback may include presenting, to a user, step-by-step instructions for configuring the processing device to work with the second device (act 712). In some embodiments, the processing device may display an indication of the relative location of the second device and may instruct the user, in a step-by-step manner, how to connect the second device with the processing device and configure the processing device to work with the second device.

FIG. 7C is a flowchart of an exemplary process 506-C for performing act 506 of FIG. 5 in another embodiment consistent with the subject matter of this disclosure. First, processor 120 of the processing device may obtain relative location information and orientation information with respect to the second device (act 720). Information about the second device may then be provided, via an application program interface (API) to an application executing on the processing device (act 722). In one embodiment, the application may pre-register to receive information regarding one or more particular types of devices. The information provided to the application may include, for example, an identifier identifying a device, such as, for example, the second device, a relative location of the second device with respect to the device, as well as other or different information about the second device. The application may then coordinate use of the second device, which may be connected to a second processing device such that the device, connected to the processing device, and the second device, connected to the second processing device, may be used together in a cooperative manner (act 724). For example, the application may provide information about the device associated with the processing device and the relative location of the second device, with respect to the device, to the second processing device.

In an embodiment consistent with the subject matter of this disclosure, a device, such as a first display monitor having short-range wireless transmitter 204, may be connected to a first processing device. A second display monitor, which may be associated with a second processing device and may include multiple short-range wireless readers 206, may be placed close to the first display monitor. Information received by short-range wireless readers 206 may be provided to processor 120 of the second processing device, which may then determine relative location and orientation of the first display monitor using techniques previously discussed, or other techniques. Based on the information received by short-range wireless readers 206, information about the first display monitor may be provided, via an API, to an application executing on processor 120 of the second processing device. The application may then contact the first processing device and coordinate use of the second display monitor with the first display monitor of the first processing device.

Figure 8:
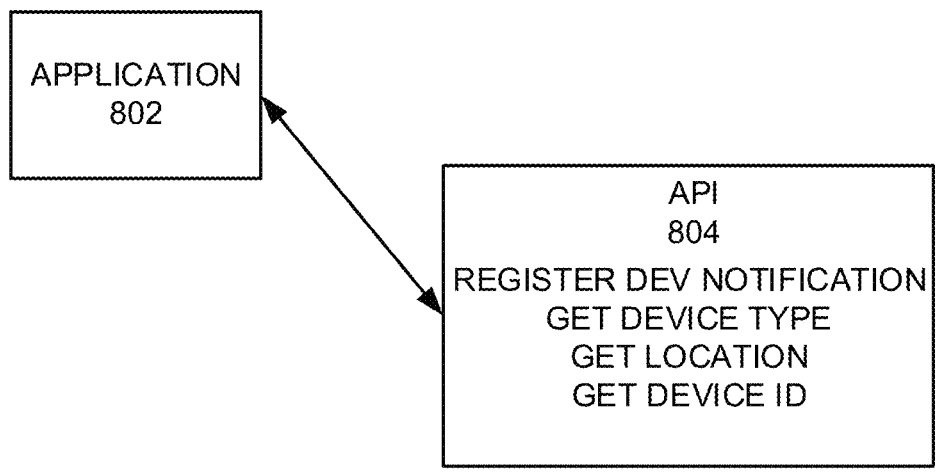
FIG. 8 is a block diagram illustrating an application registering to receive notifications with respect to one or more devices and receiving information regarding the one or more devices via an application program interface.

As mentioned above, in some embodiments consistent with the subject matter of this disclosure, an API may be provided to provide an application with information about a device detected via receiving information received through a number of short-range wireless readers 206. FIG. 8 illustrates an exemplary application 802 and an exemplary API 804. Application 802 may use API 804 to register application 802 to receive notifications regarding one or more types of devices, such as, for example, display monitors, digital cameras, or other devices. Subsequently, application 802 may receive a notification regarding detection of the one or more types of devices for which application 802 registered to receive notifications. Further, application 802 may use API 804 to obtain information about a detected device, such as, for example, a device type, a relative location of the device, an orientation of the device, a device ID, or different or other information about the device.

Miscellaneous

Short-range wireless transmitters and receivers, such as transmitters 204 and readers 206, which may use NFC technology, RFID technology, or other short-range wireless technology, may also be used for other purposes, such as swiping a smartcard, unlocking a processing device, such as, for example, a personal computer (PC), or other processing device, transferring data to other devices, authenticating a user to use one or more resources of a processing device, or other purposes. For example, a device, such as, a digital picture frame including transmitter 204, may be detected by a device, such as a keyboard including one or more readers 206. Information about the digital picture frame may be transmitted to a processor of a processing device associated with the keyboard, thereby causing the processing device to transmit digital images to the digital picture frame for display. As another example, a user may be carrying a device, such as, for example, a keychain, a digital camera, or other device, which may include short-wave wireless transmitter 204. When the keychain is close to one or more readers 206 of a processing device, an identification of the device may be received by readers 206 and may be passed to a processor of the processing device. A level of trust may have been previously established with the processing device, such that the user may be authenticated to use resources of the processing device based on the received short-range signal from transmitter 204 of the keychain. Further, the processing device may automatically configure itself to use the device.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for facilitating use of a first device with a second device, the method comprising:
    receiving, by a processing device via multiple readers of the second device, at least a portion of a short-range wireless protocol signal from a single transmitter of the first device;
    detecting, by the processing device, that the first device in proximity to the second device;
    determining, by the processing device, based on at least the portion of the short-range wireless protocol signal received via the multiple readers of the second device from the transmitter of the first device, a relative location of the first device with respect to the second device; and
    using, by the processing device, information related to the relative location of the first device to automatically configure the processing device to work with the first device and the second device.

2. The method of claim 1, wherein the short-range wireless protocol signal includes at least one of a Near Field Communication protocol signal or a Radio Frequency Identification protocol signal.

3. The method of claim 1, wherein:
    the first device includes a first display;
    the second device includes a second display; and
    the using of the information related to the relative location of the first device to facilitate use of the first device and the second device with the processing device, further comprises:
        automatically configuring at least one of the processing device, the first display, and the second display such that the first display and the second display are usable together.

4. The method of claim 1, wherein the using of the information related to the relative location of the first device to facilitate use of the first device and the second device with the processing device, further comprises:
    providing feedback to facilitate setup and use of the detected first device.

5. The method of claim 1, wherein:
    the determining of the relative location of the first device with respect to the second device, further comprises:
        using a triangulation technique, based on at least the portion of the short-range wireless protocol signal received via the multiple readers of the second device, to determine the relative location of the first device with respect to the second device.

6. The method of claim 1, further comprising:
    providing an application program interface for passing information regarding the relative location of the first device with respect to the second device to an application.

7. The method of claim 1, further comprising:
    providing, via an application program interface, information about the first device to an application executing on the processing device.

8. The method of claim 7, wherein the provided information includes an identifier identifying the first device.

9. A dynamic or static storage device having instructions stored therein such that, when the instructions are executed by at least one processor of a processing device, the processing device performs operations comprising:
    receiving, by the processing device via a first receiver of a second device, at least a portion of a short-range wireless protocol signal from a first transmitter of a first device;
    receiving, by the processing device via a second receiver of the second device, at least the portion of the short-range wireless protocol signal from the first transmitter of the first device;
    determining, by the processing device based on respective signal strengths of at least the portion of the short-range wireless protocol signal as received at each of the first and second receivers of the second device, a relative location of the first device with respect to a second device and/or an orientation of the first device; and
    using, by the processing device, information related to the relative location of the first device and/or the orientation of the first device to facilitate use of the first device and/or the second device with the processing device.

10. The dynamic or static storage device of claim 9, wherein determining the relative location and/or the orientation includes determining the relative location, wherein the information related to the relative location of the first device and/or the orientation of the first device includes information related to the relative location of the first device, and wherein the method further comprises:
    pre-registering an application executing on the processing device to receive the information regarding the relative location of the first device; and obtaining, by the application, the information regarding the relative location of the first device and an identifier identifying a type of the first device.

11. The dynamic or static storage device of claim 10, wherein the obtaining, by the application, the information regarding the relative location of the first device and the identifier identifying the type of the first device further comprises:
using, by the application, an application program interface to obtain the information regarding the relative location of the first device and the identifier identifying the type of the first device.

12. The dynamic or static storage device of claim 11, wherein the using the information related to the relative location of the first device and/or the orientation of the first device to facilitate use of the first device and the second device with the processing device further comprises:
coordinating, by the application, use of the first device and the second device.

13. The dynamic or static storage device of claim 10, wherein the pre-registering of the application to receive information regarding the relative location of the first device with respect to the second device further comprises:
using, by the application, an application program interface to pre-register the application to receive the information regarding the relative location of the first device.

14. A processing device comprising:
at least one processor; and
a dynamic or static storage device connected to the at least one processor, wherein the dynamic or static storage device includes instructions for the at least one processor to perform operations comprising:
receiving, via a first receiver, at least a portion of a wireless signal from a transmitter of a first device;
receiving, via a second receiver, at least the portion of the wireless signal from the transmitter of the first device;
determining, based on at least the portion of the wireless signal received via the first receiver and on at least the portion of the wireless signal received via the second receiver, a relative location of the first device with respect to the processing device and/or with respect to a second device; and
facilitating use of the first device with the processing device and/or with the second device based on the relative location of the first device.

15. The processing device of claim 14, wherein:
determining the relative location of the first device with respect to the processing device and/or with respect to a second device includes determining the relative location of the first device with respect to the second device;
the second device includes the first receiver and the second receiver; and
determining the relative location of the first device with respect to the second device includes using a triangulation technique to determine the relative location of the first device with respect to the second device.

16. The processing device of claim 14, wherein:
determining the relative location of the first device with respect to the processing device and/or with respect to a second device includes determining the relative location of the first device with respect to the second device;
the first device includes a first display;
the second device includes a second display; and
the facilitating use of the first device includes coordinating use of the first display and the second display.

17. The processing device of claim 14, wherein:
the first device includes a digital camera;
the transmitter is a short-range wireless transmitter of the digital camera, and
the processing device includes the first receiver and the second receiver.

18. The processing device of claim 17, wherein the operations further comprise:
obtaining an identifier of the digital camera, the identifier being received via the wireless signal.

19. The processing device of claim 18, wherein the operations further comprise:
obtaining signal strength information from the first receiver and from the second receiver, wherein
the determining of the relative location of the first device with respect to the processing device and/or with the second device is based, at least in part, on the obtained signal strength information.

20. The processing device of claim 14, wherein the facilitating use of the first device further comprises:
providing feedback to a user to facilitate use of the first device with the processing device, the feedback including instructions for configuring the processing device to use the first device.

* * * * *